US005412777A

United States Patent [19]

Wakimoto

[11] Patent Number: 5,412,777

[45] Date of Patent: May 2, 1995

[54] DISPLAY DEVICE HAVING A BUILT-IN MEMORY

[75] Inventor: Kingo Wakimoto, Itami, Japan

[73] Assignee: Mitsubishi Denki Kabushiki Kaisha, Tokyo, Japan

[21] Appl. No.: 890,148

[22] Filed: May 29, 1992

[30] Foreign Application Priority Data

Aug. 7, 1991 [JP] Japan ............................ 3-197650

[51] Int. Cl.[6] ............................................ G06F 3/14

[52] U.S. Cl. ................................ 395/166; 345/28; 345/190; 345/200; 345/203; 364/237.2; 364/245.4; 364/DIG. 1

[58] Field of Search ................ 345/190, 200, 203, 28; 395/164, 166

[56] References Cited

U.S. PATENT DOCUMENTS 4,471,461 9/1984 Boone ................................ 395/800

*Primary Examiner*—Robert L. Richardson

*Attorney, Agent, or Firm*—Oblon, Spivak, McClelland, Maier & Neustadt

[57] ABSTRACT

A timing generator 12' applies a control signal SC1 consisting of a row address strobe signal $\overline{RAS1}$, a column address strobe signal $\overline{CAS1}$ and a writing control signal $\overline{WE1}$ to a control input C of a DRAM 31 while it also applies a control signal SC2 consisting of a row address strobe signal $\overline{RAS2}$, a column address strobe signal $\overline{CAS2}$ and a writing control signal $\overline{WE2}$ to a control input C of a DRAM 32. The control signals SC1and SC2 are produced in accordance with the least significant bit LSB of an inside address MA and independent of each other. The display data reading operation can be performed on each of memories (DRAMs) independent of each other, and therefore, the total period for the display data reading can be shortened, and accordingly, a saving of time allows an interruption of a longer period of the display data writing operation during the display period, and thus, a time for a display data renewal can be shortened.

8 Claims, 9 Drawing Sheets

DISPLAY DEVICE HAVING A BUILT-IN MEMORY

BACKGROUND OF THE INVENTION

1. Field of the Invention

The present invention relates to a display device for performing display data reading and writing operations during a specified display period.

2. Description of the Prior Art

FIG. 7 is a block diagram showing a conventional display device. As shown in FIG. 7, the display device consists of a CPU 1, a display control unit 2, a pixel information recording DRAMs 31, 32 and a display unit 4.

The CPU 1 applies 16 bit system address SA for specifying a writing address to the DRAM 31, 32 and 8-bit system data SD for specifying writing data to the dislay control unit 2.

The system address SA is taken in at an A-input of a selector 11 within the display control unit 2. The selector 11 takes in 16-bit display address DA generated by a display address generator 10 at its B-input, and then, in accordance with a selection signal S12 received from the timing generator 12 to a control input S, applies one of the system address SA and display address DA as an inside address MA by 8 bits (in order of the most significant 8 bits followed by the least significant 8 bits) to address inputs A of the DRAMs 31, 32, respectively.

Beside the above mentioned selective signal 12, the timing generator 12 synchronizes a clock CLK received from the outside to apply a timing signal T1 to a T-input of a serial/parallel converter 15 and a timing signal T2 to a T-input of a holding circuit 14 (consisting of circuits 14*a* and 14*b*). The timing generator 12 also applies control signal SC consisting of a row address strobe signal $\overline{RAS}$, a column address strobe signal $\overline{CAS}$ and a writing control signal $\overline{WE}$ to control inputs C of the DRAMs 31, 32, respectively, and the writing control signal $\overline{WE}$ to a buffer 13.

The buffer 13 is activated when the writing control signal $\overline{WE}$ turns to Low, and applies the system data SD as the inside data MD; the least significant 4 bits to a data input/output D of the DRAM 31 and the most significant 4 bits to a data input/output D of the DRAM 32, respectively.

The holding circuits 14*a*, 14b receive 4-bit data d1, d2 from the data inputs/outputs D of the DRAMs 31, 32 and take them in as 4-bit latch data at a control timing of the timing signal T2 to apply the 4-bit latch data from Q-outputs to a D-input of the serial/parallel converter 15.

The serial/parallel converter 15 takes in the two 4-bit latch data from the holding circuits 14*a*, 14*b* at a control timing of the timing signal T1 to apply them as 8-bit display data VD from its Q-output to the display unit 4.

The DRAMs 31, 32 store the inside data MD taken in from the data inputs/outputs D as writing data in addresses specified by the inside address MA upon writing, under the control of the control signal SC taken in the control inputs C to apply the data stored in the address specified by the inside address MA upon writing from the data inputs/outputs D.

FIG. 8 is a timing chart showing the reading and writing operations of display data in the display device shown in FIG. 7. Now, the display data writing operation will be described with reference to FIG. 8.

First, the system address SA from the CPU1 is taken in from the A-input of the selector 11. At this time, the selector 11 is set so as to apply the A-input as the inside address MA in accordance with an instruction of the selection signal S12. Thus, the system address SA is output in order of the most significant eight bits followed by the least significant eight bets as the inside address MA.

In accordance with the falling of a row address strobe signal $\overline{RAS}$, a row address RA (the most significant 8 bits of the system address SA) as the inside address MA is applied commonly to the address inputs A of the DRAM 31, 32. Then, after the writing control signal $\overline{WE}$ is set to Low, with the successive falling of the column address strobe signal $\overline{CAS}$, a column address CA (the least significant 8 bits of the system address SA) as the inside address MA is applied commonly to the address inputs A of the DRAMs 31, 32 to set writing addresss to the DRAMs 31, 32.

At the same time, since the writing control signal WE is Low and the buffer 13 is activated, system data SD are applied as the inside data MD from the buffer 13 to the data inputs/outputs D of the DRAMs 31, 32. Specifically, the most significant 4 bits of the inside data MD are applied to the data input/output D of the DRAM 32 while the least significant 4 bits are applied to the data input/output D of the DRAM 31.

With the above-mentioned operation, the data specified by the system data SD are written in the addresses of the DRAMs 31, 32 specified by the system address SA.

FIG. 9 is a diagram showing an address arrangement in the DRAMs 31, 32. As shown in FIG. 9, each of the DRAMs 31, 32 has an address space of 64K×4 (bits); the DRAM 31 stores the least significant 4-bit data of the display data in its addresses 0000 h to FFFFh while the DRAM 32 stores the most significant 4-bit data of the display data in its addresses 0000 h to FFFFh. Thus, a single attempt of the above mentioned writing operation allows the display data to be written in one address in each of the DRAMs 31, 32.

Next, the display data reading operation will be described. During the display data reading operation, the display address generator 10 applies the display address DA to the B-input of the selector 11, incrementing address by address from a start address 0000 h. At this time, the selector 11 is set so that it may output the B-input as the inside address MA according to an instruction of the selection signal S12. Thus, the display address DA is applied in order of the most significant 8 bits followed by the least significant 8 bits as the inside address MA to the address inputs A of the DRAMs 31, 32. The writing control signal $\overline{WE}$ during the display operation is fixed in High (shown by a broken line in FIG. 8).

With the falling of the row address strobe signal $\overline{RAS}$, the row address RA (the most significant 8 bits of the display address DA) as the inside address MA is applied commonly to the address inputs A of the DRAMs 31, 32. Then, with the falling of the column address strobe signal $\overline{CAS}$, the column address CA (the least significant 8 bits of the display address DA) as the inside address MA is applied commonly to the address inputs A of the DRAMs 31, 32.

Then, in accordance with the control signal SC from the timing generator 12, the DRAMs 31, 32 apply the 4-bit data d1, d2, or the data stored in the addresses specified by the inside address MA, from the date inputs/outputs D. Then, the holding circuits 14*a*, 14*b* take in the 4-bit data d1, d2 as 4-bit latch data at a timing specified by the timing signal T2 of the timing generator 12.

After that, according to an instruction of the timing signal T1 from the timing generator 12, the serial/parallel converter 15 takes in the 4-bit latch data obtained from the Q-outputs of the holding circuits 14*a*, 14*b* at its D-input and applies 8-bit display data VD from its Q-output to the display unit 4. The above statement is about the display data reading operation, and successively, the display unit 4 displays an image in accordance with the display data VD.

After that, a display address generator 10 alters the display address DA by incrementing one by one to perform the above mentioned display data reading operation and image display operation to all the addresses of which a picture is made up, so that a picture of display data are displayed on the display unit 4. Thereafter, the display unit 4 always displays the same picture unless the data stored in the DRAMs are renewed.

To change the picture contents displayed on a screen of the display unit 4, naturally it is necessary to renew the data stored in the DRAMs 31, 32. As shown in FIG. 10, the renewal of the data stored in the DRAMs 31, 32 are carried out by an interruption of a display data reading cycle and display writing cycle together during a display period.

In an example shown in FIG. 10, the interruption of the display data writing cycle is performed once per seven times of display data reading cycles (1) to (7) during the display period when the display data presents 7 bytes (8 bits×7=56) pixels. The reason why the display period can be interrupted by the display data writing cycle is that a time required for the image display on the display unit 4 is longer than the display data reading period upon the display of a specified number (e.g., 1 byte) of pixels. Thus, by virtue of a difference in time between 1-bite display period and 1-bite display data reading time calculated in accordance with a required timing of the DRAMs, the interruption of the display data writing cycle once per specified cycles (7 cycles in the example shown in FIG. 10) is possible.

In the conventional display device structured as mentioned above, a display data writing cycle is set once per a specified number of display data reading cycles during a specified display period. In such a conventional method, however, a time required for a display data reading cycle is not adequately short, and there is not a sufficient time for an interruption of a display data renewal cycle during the specified display period. Accordingly, there arises the problem that a time required for the display data renewal is too long during the display period.

SUMMARY OF THE INVENTION

According to the present invention, a display device for performing display data reading and writing operations during a specified display period includes a plurality of memories, the display data in a unit of n bits being read from and written to each of the plurality of memories; absolute address applying means for applying an absolute address; data applying means for applying writing data of (n×m) bits; memory selecting means for selecting one of the memories as a selected memory in accordance with at least a part of the absolute address to make an access to the selected memory independent of other memories; access address producing means for altering the part of the absolute address to successively produce m access addresses at a specified timing; writing control means for storing the writing data by n bits in each of the m access addresses in the selected memory in writing the display data; reading control means for taking out n-bit data stored in each of the m access addresses in the selected memory in reading the display data to output display data of (n×m) bits; and display unit receiving the display data for presenting an image in accordance with the display data.

Preferably, the memories are DRAMs.

Further preferably, the absolute address applying means includes a CPU for outputting a system address, a display address generator for generating a display address, and selecting means for outputting the system address as the absolute address in writing the display data while it outputs the display address as the absolute address in reading the display data.

Preferably, the data applying means is a CPU.

Still preferably, the writing control means includes selecting means for taking in the writing data as m latch data of n bits in parallel with each other to output any of the m latch data of n bits in accordance with at least a part of the access address.

Yet preferably, the reading control means includes m holding circuits having their respective inputs connected commonly to data outputs of the memories for holding n-bit data taken in from the respective inputs as n-bit latch data when they are activated, the m holding circuits outputting the n-bit latch data after they are selectively activated in succession at a specified timing, and a parallel/serial converter for taking in the n-bit latch data of the m holding circuits to output the display data of (n×m) bits.

Preferably, the m access addresses are successive addresses.

Further preferably, the m access addresses are composed of row and column addresses, the row addresses are fixed while the column addresses are in succession, the reading control means performs the reading operation on the m access addresses in the selected memory in a manner of page mode reading.

In the present invention, the memory selecting means selects one of a plurality of memories as a selected memory in accordance with at least a part of the absolute address and makes an access to the selected memory independent of the other memories, and therefore, the display data reading operation can be performed at high speed with a specified memory being selected successively among the memories.

As a result, a time required for the display data reading operation is shortened, and accordingly, more display data writing cycles can be implemented during a specified period. Thus, the writing of the desired display data can be effectively performed during the display period for a short time.

Accordingly, it is an object of the present invention to provide a display device in which a time required for a renewal of display data during a display period can be shortened.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
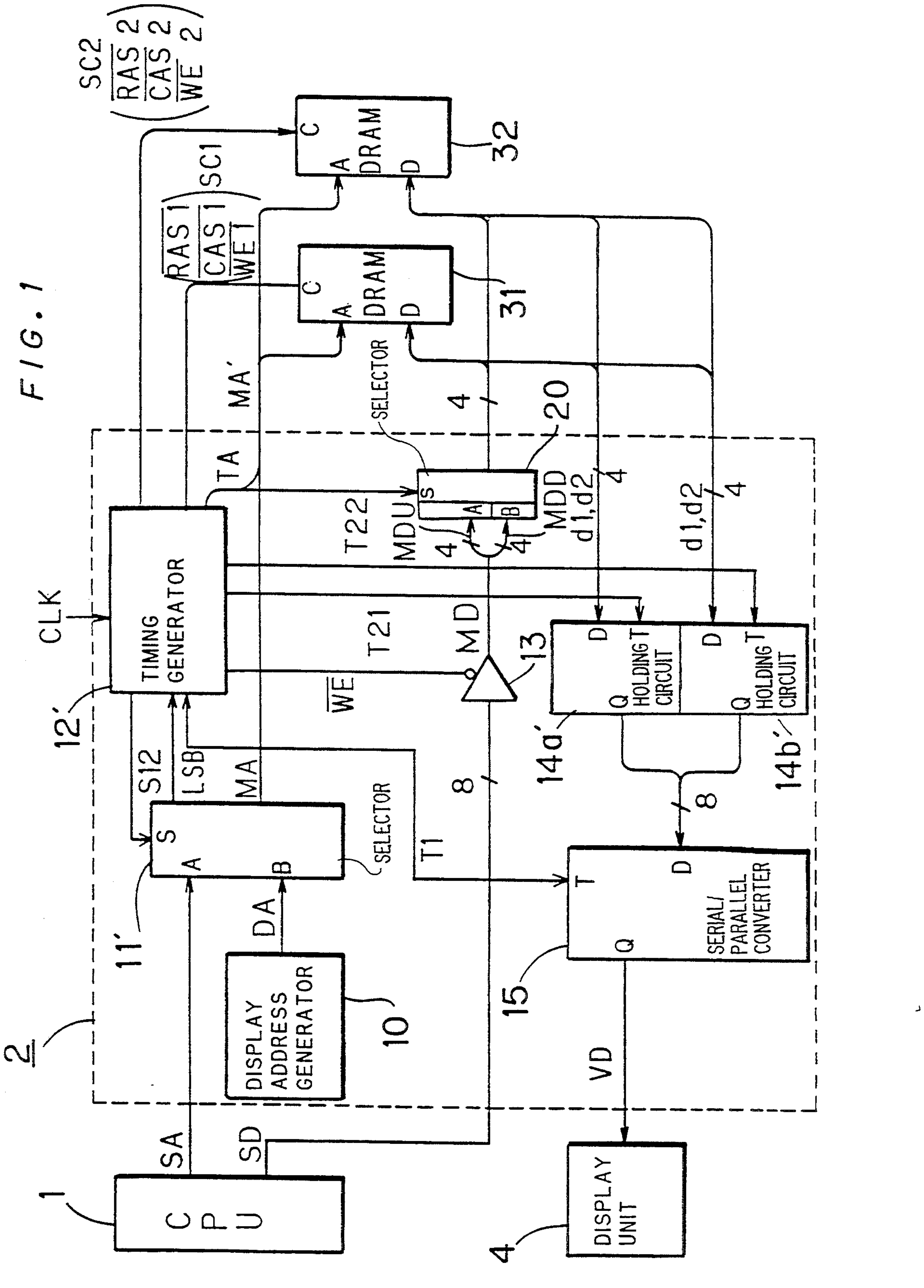
FIG. 1 is a block diagram showing a structure of a display device of an embodiment according to the present invention.

FIG. 1 is a block diagram showing a structure of a display device of an embodiment according to the present invention. As shown in FIG. 1, a selector 11' takes in a system address SA at its A-input and a display address DA at its B-input to apply one of the system address SA and display address DA as an inside address MA by 8 bits (in order of the higher 8 bits followed by the lower 8 bits) to address inputs A of DRAMs 31, 32 in accordance with a selection signal S12 received from a timing generator 12' to a control input S. Moreover, the selector 11' applies the least significant bit LSB in the lower 8 bits to the timing generator 12'.

The timing generator 12' synchronizes a clock CLK received from the outside to apply the selection signal S12 to the control input S of the selector 11', a timing signal T1 to a T-input of a serial/parallel converter 15, and a writing control signal $\overline{\text{WE}}$ to a buffer 13, as in the conventional embodiment.

The timing generator 12' applies a timing signal T21 to a T-input of a holding circuit 14*a'* and a timing signal T22 to a T-input of a holding circuit 14*b*, applies a control signal SC1 consisting of a row address strobe signal $\overline{\text{RAS1}}$, a column address strobe signal $\overline{\text{CAS1}}$ and a writing control signal $\overline{\text{WE1}}$ to a control input C of the DRAM 31, and applies a control signal SC2 consisting of a row address strobe signal $\overline{\text{RAS2}}$, a column address strobe signal $\overline{\text{CAS2}}$ and a writing control signal $\overline{\text{WE2}}$ to a control input C of the DRAM 32. The timing signals T21, T22 are signals independent of each other. The control signals SC1 and SC2 are produced in accordance with the least significant bit LSB of the inside address MA and independent of each other.

Also, the timing generator 12' applies a 1-bit timing address TA which varies at a specified timing to a control input S of a selector 20 in accordance with the least significant bit LSB of the inside address MA and applies the timing address TA as the least significant bit of the inside address MA.

The selector 20 is interposed between an output of the buffer 13 and the data inputs/outputs D of the DRAMs 31, 32 and it takes in the most significant 4-bit MDU in inside data MD received from the buffer 13 at its A-input and takes in the least significant 4-bit MDD at its B-input. The selector 20 outputs one of the most significant 4-bit MDU and the least significant 4-bit MDD in accordance with 1/0 of the timing address TA received from the control input S.

Figure 7:
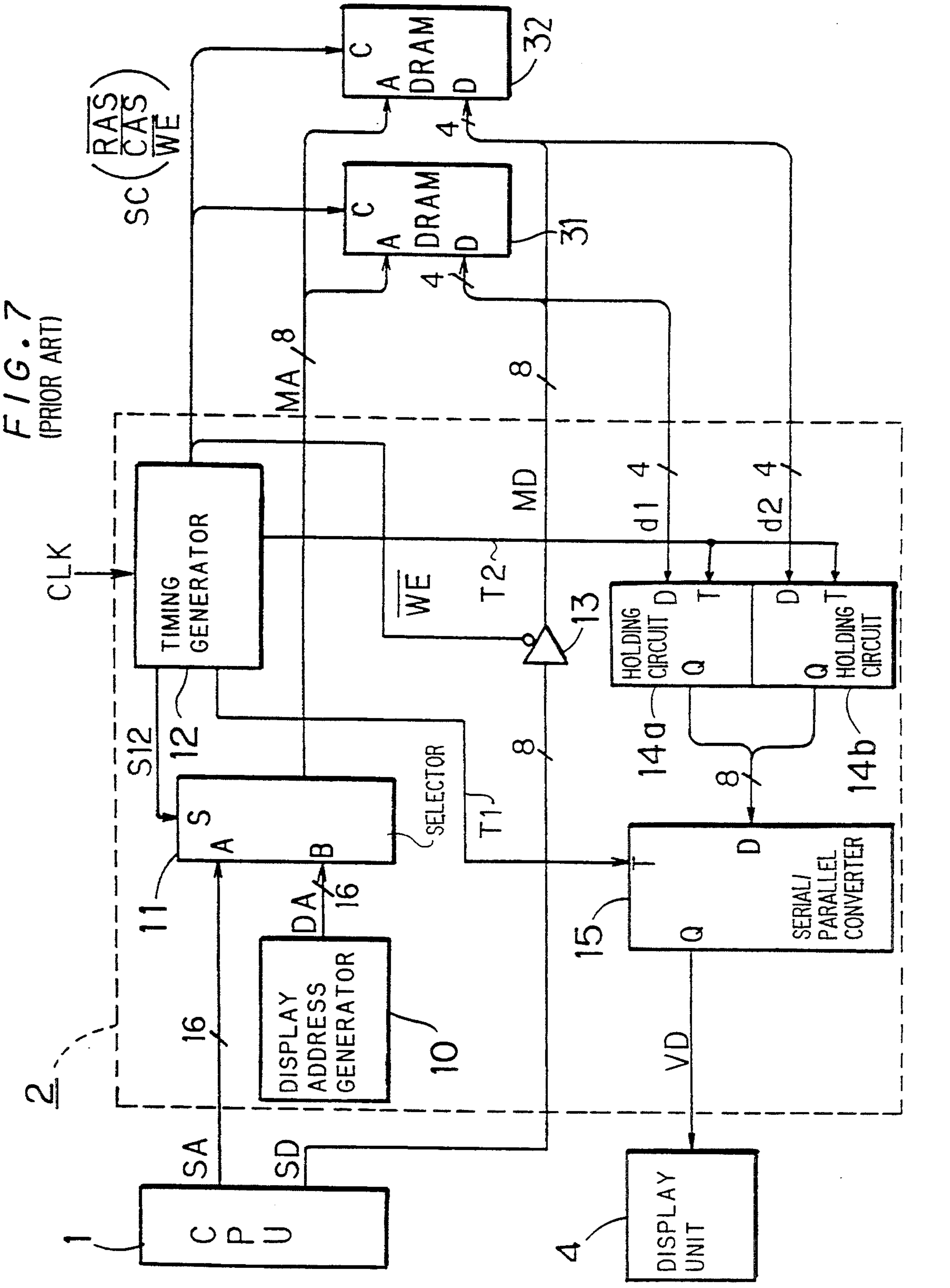
FIG. 7 (PRIOR ART)
FIG. 7 is a block diagram showing a structure of a conventional display Control device.
Figure 8:
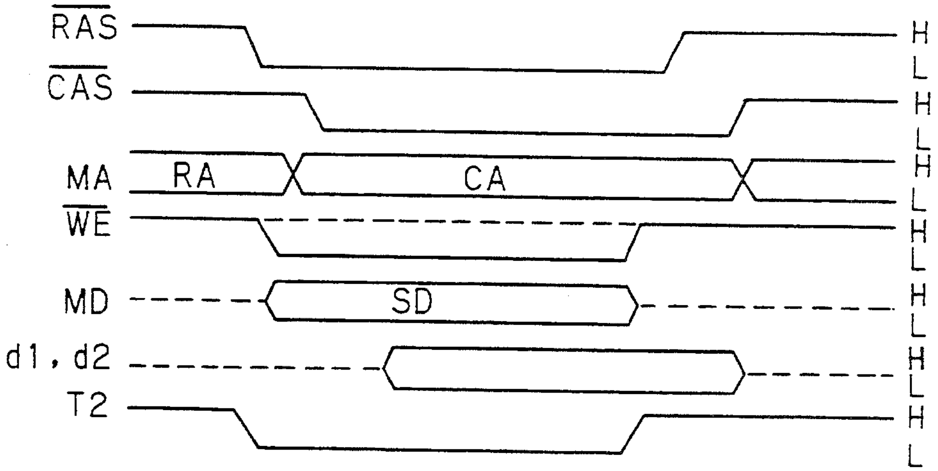
FIG. 8 (PRIOR ART)
FIG. 8 is a waveform diagram showing display data writing and reading operations in the display device shown in FIG. 7.
Figure 9:
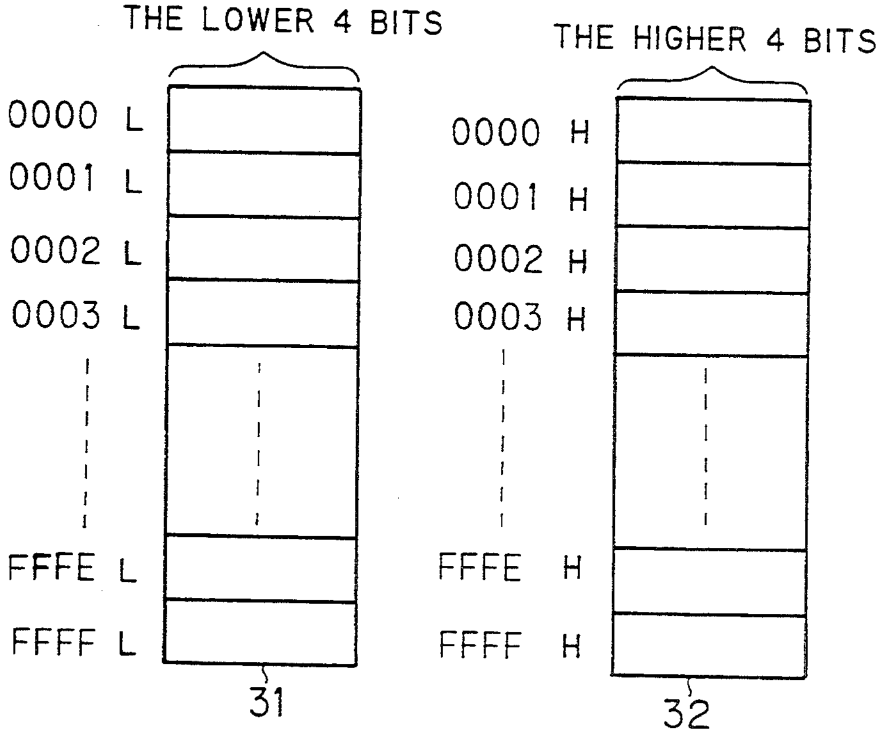
FIG. 9 (PRIOR ART)
FIG. 9 is a diagram showing an address arrangement in DRAMs shown in FIG. 7.

The holding circuits 14*a'*, 14*b'* receive commonly at their respective D-inputs 4-bit data output d1, d2 received from the data inputs/outputs D of the DRAMs 31, 32, take in the data output d1 or d2 as 4-bit latch data from the D-inputs at control timings of the timing signals T21, T22 and apply the 4-bit latch data from their respective Q-outputs to the D-input of the serial/parallel converter 15. The other components are similar to those of the conventional embodiment shown in FIG. 7, and so the description is omitted.

Figure 2:
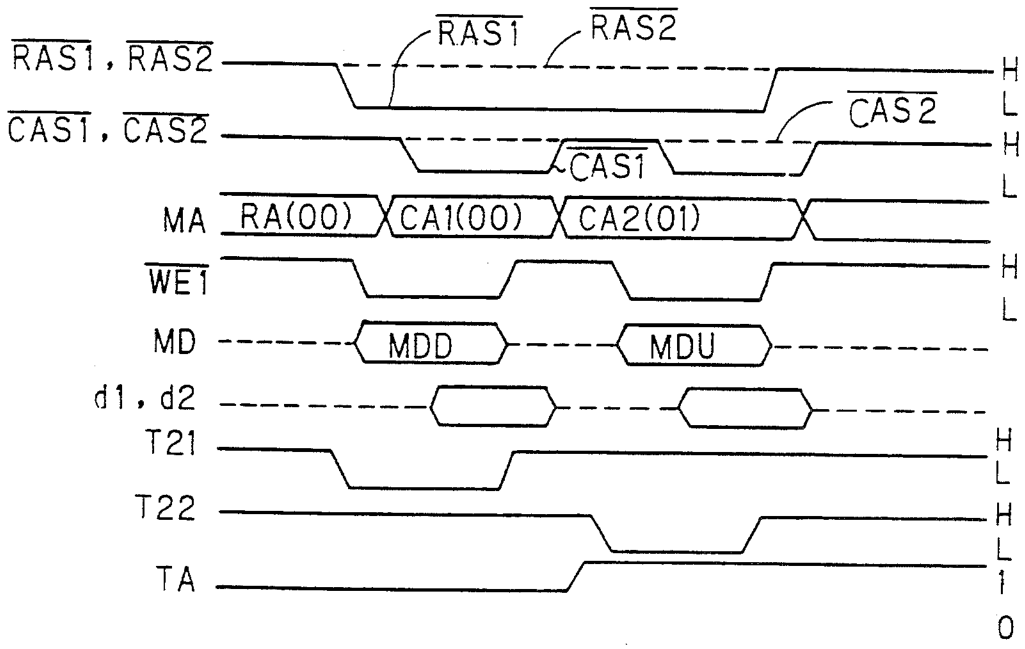
FIG. 2 is a waveform diagram showing display writing and reading operations in the display device shown in FIG. 1.

FIG. 2 is a timing chart showing the display data writing and reading operations of the display device shown in FIG. 1. Now, the display data writing operation will be described with reference to FIG. 2.

First, the system address SA (referred to as 0000 h for expediency) is taken in as an absolute address from the CPU1 at the A-input of the selector 11'. At this time, the selector 11' is set so that it may output the A-input as the inside address MA according to an instruction of the selection signal S12. Thus, the system address SA is output as the inside address MA in order of the most significant 8 bits (00 h) followed by the least significant 8 bits (00 h).

Simultaneously, the least significant bit of the system address SA is applied as the least significant bit LaB (=0) of the inside address MA of the selector 11' to the timing generator 12'. The timing generator 12' generates control signals SC1, SC2 in accordance with the least significant bit LSB to enable one of the DRAMs 31, 32 and disenable the other. In this case, since LSB=O, the DRAM 31 is enabled while the DRAM 32 is disenabled. Thus, the row address strobe signal $\overline{\text{RAS2}}$ and column address strobe signal $\overline{\text{CAS2}}$ of the control signal SC2 are fixed in High (shown by a broken line in FIG. 2).

Now, the writing operation when the DRAM 31 is enabled will be described.

With the falling of the row address strobe signal $\overline{\text{RAS1}}$, a row address RA (the most significant 8 bits of the system address SA) as the inside address MA is applied commonly to the address inputs A of the DRAMs 31, 32 to set the writing control signal $\overline{\text{WE}}$ to Low for the writing, and then, with the falling of the column address strobe signal $\overline{\text{CAS1}}$, a column address CA1 as the inside address MA is applied to the address input A of the DRAM 31.

At this time, since the column address CA1 has the least significant bit of the column address CA1 of the lower 8 bits (00 h) of the system address SA forcibly set to "0" by the timing address TA to make the column address CA1 "00 h", the setting of the writing address 0000h in the DRAM 31 is completed.

On the other hand, since the writing control signal $\overline{\text{WE}}$ is at Low and the buffer 13 is activated, the system data SD is applied as the inside data MD from the buffer 13 to A-and B-inputs of the selector 20, and since the timing address TA is "0", the selector 20 applies the lower 4-bit data MDD of the inside data MD to the data input/output D of the DRAM 31.

As a result, the lower 4-bit data MDD are written in the address 0000 h of the DRAM 31.

Then, the column address strobe signal $\overline{CAS1}$ rises while the row address strobe signal $\overline{RAS1}$ from the timing generator 12' is fixed at Low to turn the timing address TA to "1", and thereafter, the column address strobe signal $\overline{CAS1}$ again falls so that a page mode writing can be performed.

Specifically, while the row address is fixed, the column address CA2 as the inside address MA is applied to the address input A of the DRAM 31 in accordance with the second falling of the column address strobe signal $\overline{CAS1}$.

At this time, the column address CA2 has the least significant bit of the column address CA2 of the lower 8 bits (00 h) of the system address SA forcibly set to "1" by the timing address TA to be 01 h, the setting of the writing address 0001 h in the DRAM 31 is completed.

On the other hand, since the writing control signal $\overline{WE}$ is at Low and the buffer 13 is activated, the system data SD is applied as the inside data MD from the buffer 13 to the A- and B-inputs of the selector 20, and since the timing address TA is "1", the selector 20 applies the most significant 4-bit data MDU of the inside data MD to the data input/output D of the DRAM 31.

As a result, the higher 4-bit data MDU is written in the address 0001 h of the DRAM 31. In other words, in the event that the system address SA ,or the absolute address, is 0000 h, the DRAM 31 is selected between the DRAMs 31, 32, and the lower 4 bits of the system data SD are stored in the address 0000 h of the DRAM 31 while the higher 4 bits of the system data SD are stored in the address 0001 h of the DRAM 31.

In this way, when the system address SA, or the absolute address, is applied, one of the DRAMs 31 and 32 is selected and data are stored in order of the lower 4 bits followed by the higher 4 bits of the system data SD in successive two access addresses which are determined in accordance with the address specified by the system address SA except for the least significant bit and the timing address TA output from the timing generator 12', and thus, the writing operation of the selected DRAM is completed.

Figure 3:
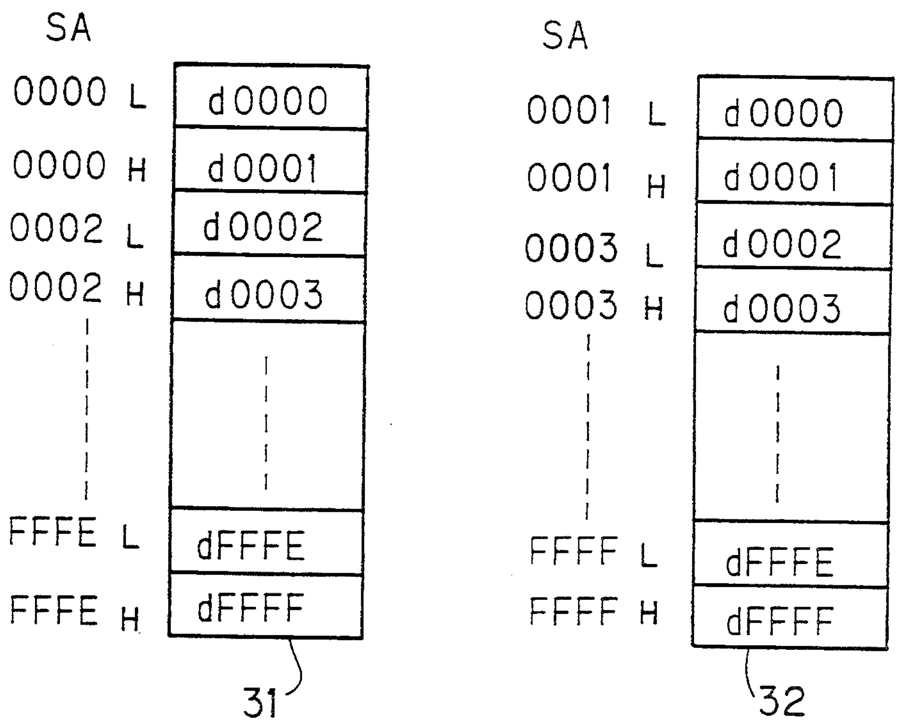
FIG. 3 is a diagram showing an address arrangement in DRAMs shown in FIG. 1.

FIG. 3 is a diagram showing an address arrangement in the DRAMs 31, 32. As shown in FIG. 3, the DRAM 31 stores display data in order of the lower 4 bits followed by the higher 4 bits corresponding to the addresses 0000 h, 0002 h to FFFEh of the system address SA of which least significant bit is "0" On the other hand, the DRAM 32 stores the display data in order of the lower 4 bits followed by the higher 4 bits corresponding to the addresses 0001 h, 0003 h to FFFFh of the system address SA of which least significant bit is "1". Also, in FIG. 3, dxxxx expresses the display data stored in an address xxxx in the DRAMs 31, 32.

Now, the display data reading operation will be described.

The display address generator 10 applies a display address DA to the B-input of the selector 11' while incrementing the address 0000 h as a start address one by one. Assume now that the start address 0000 h is output. At this time, the selector 11' is set so that it may output the B-input as the inside address MA according to an instruction of the selection signal S12. Thus, the display address DA is output as the inside address MA in order of the higher 8 bits followed by the lower 8 bits. The writing control signal $\overline{WE}$ when the display data is read out is fixed at High.

Simultaneously, the least significant bit of the display address DA is applied as the least significant bit LSB of the inside address MA of the selector 11' to the timing generator 12'. The timing generator 12' generates the control signal SC1, SC2 in accordance with the least significant bit LSB so as to enable one of the DRAMs 31 and 32 and disenable the other. In this case, since LaB=0, the DRAM 31 is enabled while the DRAM 32 is disenabled. Thus, similar to the writing, the row address strobe signal $\overline{RAS2}$ and column address strobe signal $\overline{CAS2}$ of the control signal SC2 are fixed at High.

Then, the timing address TA is turned to "0", and the timing signal T21 is set to Low while the timing signal T22 is set to High.

In this state, with the falling of the row address strobe signal RAS, the row address RA (the higher 8 bits of the display address DA=00 h) as the inside address MA is applied to the address inputs A of the DRAMs 31, 32. Then, successively, with the falling of the column address strobe signal CAS, the column address CA1 as the inside address MA is applied to the address inputs A of the DRAMs 31, 32.

At this time, since the least significant bit of the column address CA1 of the lower 8 bits (00 h) of the display address DA is forcibly set to "0" by the timing address TA of the timing generator 12' to make the column address CA2 "01 h", the setting of the reading address 0000 h in the DRAM 31 is performed.

The DRAM 31 in an enable state applies 4-bit data d0000 which is the data stored in the address 0000 h from its data input/output D in accordance with the control signal SC1 from the timing generator 12'.

Then, the holding circuit **14*b*'** alone is activated because of the timing signal T22 turning to High, and it takes in the 4-bit data d0000 as the 4-bit latch data.

Then, the column address strobe signal $\overline{CAS1}$ rises while the row address strobe signal $\overline{RAS1}$ is fixed in Low to turn the timing address TA to "1, and the timing signal T21 is set to High while the timing signal T22 is set to Low. After that, the column address strobe signal $\overline{CAS1}$ again falls so that a page mode writing can be performed.

Specifically, with the row address being fixed, the column address CA2 as the inside address MA is output to the address input A of the DRAM 31 in accordance with the second falling of the column address strobe signal $\overline{CAS1}$.

At this time, since the least significant bit of the column address CA2 of the lower 8 bits (00 h) of the display address DA is forcibly set to "1" by the timing address TA of the timing generator 12' to make the column address CA1 "00 h", the setting of the reading address 0000 h in the DRAM 31 is completed.

The DRAM 31 applies 4-bit data d0001 which is the data stored in the address 0001 h from its data input-/output D in accordance with the control signal SC from the timing generator 12'. Then, the holding circuit **14*a*'** alone is activated because of the timing signal T22 turning to Low, and it takes in the 4-bit data d0001 as the 4-bit latch data.

As a result, the data d0000 stored in the address 000 h of the DRAM 31 are stored as the 4-bit latch data in the holding circuit **14*a*' while the data d0001 stored in the address 0001 h of the DRAM 31 are stored as the 4-bit latch data in the holding circuit 14*b*'**.

After that, each of the holding circuits **14*a*, 14*b*' applies the 4-bit latch data from its Q-output to the D-input of the serial/parallel converter 15. The serial/parallel converter 15 takes in the 4-bit latch data from each of the holding circuits 14***a*′, 14*b*′ at its D-input according to an instruction of the timing signal T1 from the timing generator 12′ to apply the display data VD of 8 bits from its Q-output to the display unit 4. The above statement is about the reading operation, and succeedingly, the display unit 4 presents an image in accordance with the display data VD.

After that, the display address generator 10 alters the display address DA by incrementing one by one to perform the above mentioned display data reading operation and image display operation to all the addresses of which a picture is made up, so that a picture of display data are displayed on the display unit 4. Thereafter, the display unit 4 always displays the same picture unless the data stored in the DRAMs are renewed.

In this way, when the system address SA, or the absolute address, is applied, one of the DRAMs 31 and 32 is selected and data are read out from the selected DRAM in order of the lower 4 bits followed by the higher 4 bits in successive two access addresses which are determined in accordance with the address specified by the display address DA except for the least significant bit and the timing address TA output from the timing generator 12′.

Thus, with the structure in this embodiment, the DRAMs 31, 32 perform completely independent display data writing and reading operations of each other.

Figure 4:
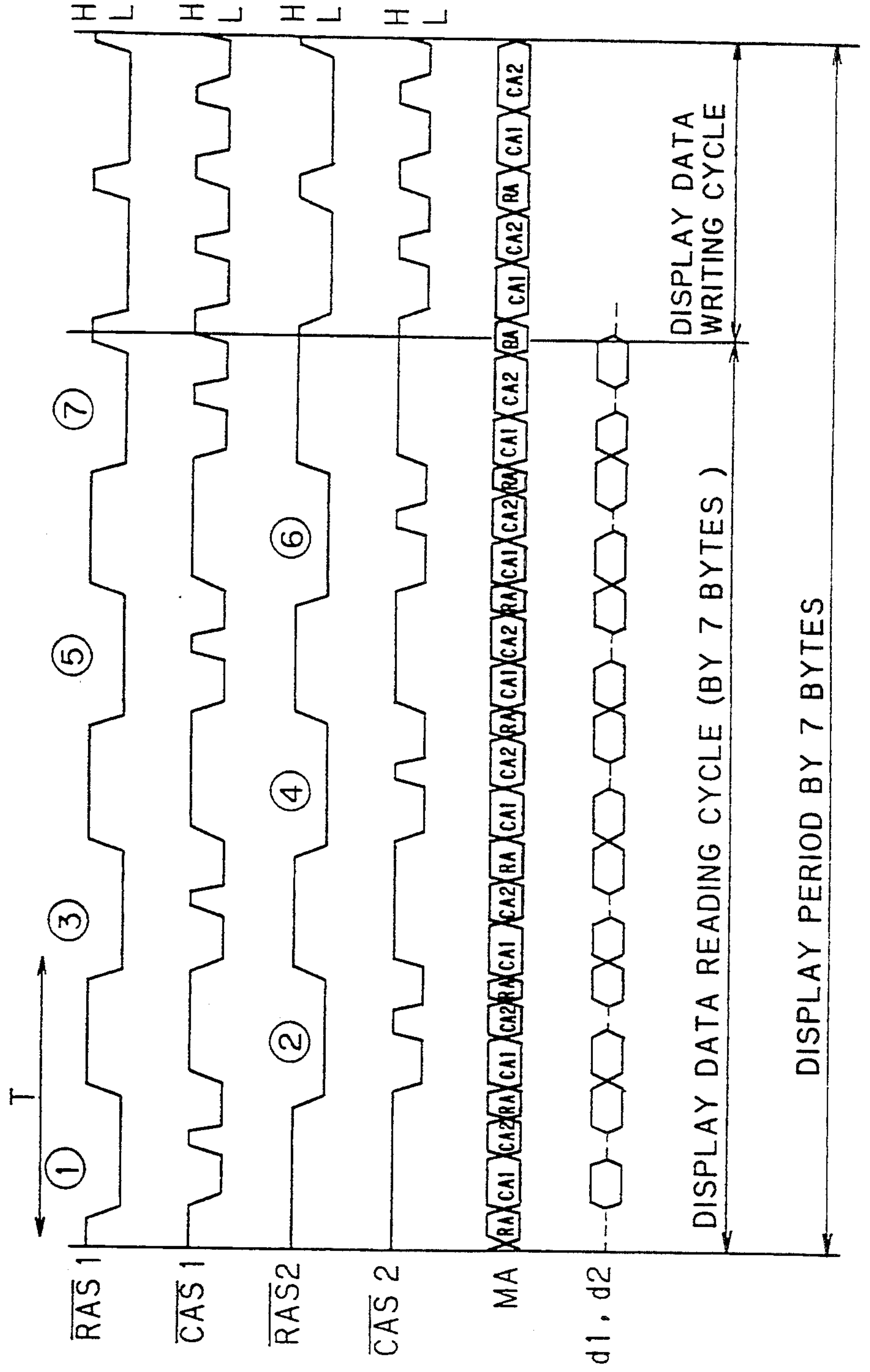
FIG. 4 is a waveform diagram showing a display cycle of the display device shown in FIG. 1.

FIG. 4 is a wave form chart showing a display cycle. As shown in FIG. 4, page mode reading operations ①, ③, ⑤ and ⑦ to the DRAM 31 and page mode reading operations ②, ④ and ⑥ to the DRAM 32 are alternately performed in a single byte (by two addresses) without duplication of the reading data d1, d2.

Figure 10:
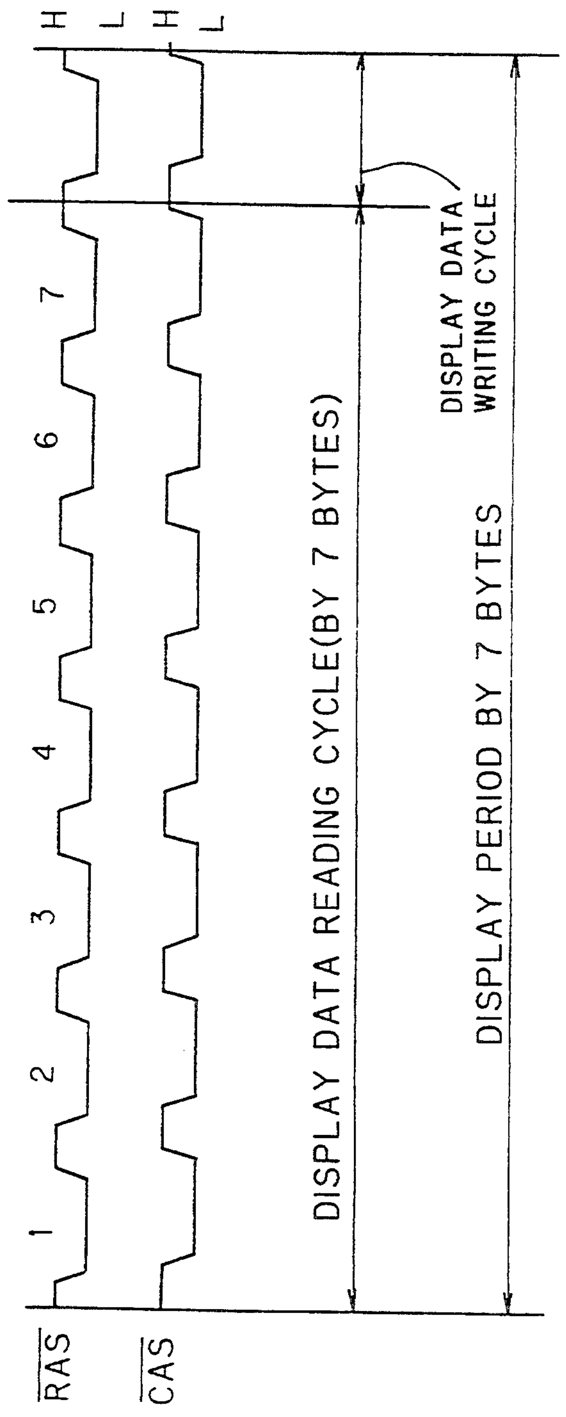
FIG. 10 (PRIOR ART)
FIG. 10 is a wave form diagram showing a display cycle of the display device shown in FIG. 7.

In comparison of FIG. 4 with the conventional display cycle shown in FIG. 10, conventionally a single cycle of the row address strobe signal $\overline{\text{RAS}}$ corresponds to the display data reading cycle.

On the other hand, in this embodiment, 1-byte reading cycles to the DRAMs 31, 32, similar to the conventional embodiment, take single cycles of the row address strobe signals $\overline{\text{RAS1}}$ and $\overline{\text{RAS2}}$, but since the reading control can be performed individually upon the DRAMs 31, 32, the display data reading operation of the DRAM 31 can be performed immediately followed by the display data reading operation of the DRAM 32 by one byte, and consequently, two bytes of display data reading cycles can be interposed in a period T equivalent to a single cycle of the row address strobe signal $\overline{\text{RAS}}$.

As a result, since a time required for the display data reading can be shortened and a saving of time can be utilized for a display data writing cycle, an interruption of the display data renewal cycle during the display period can be performed a greater deal compared with the conventional embodiment, and accordingly, a time required for the display data renewal during the display period can be effectively shortened.

Figure 5:
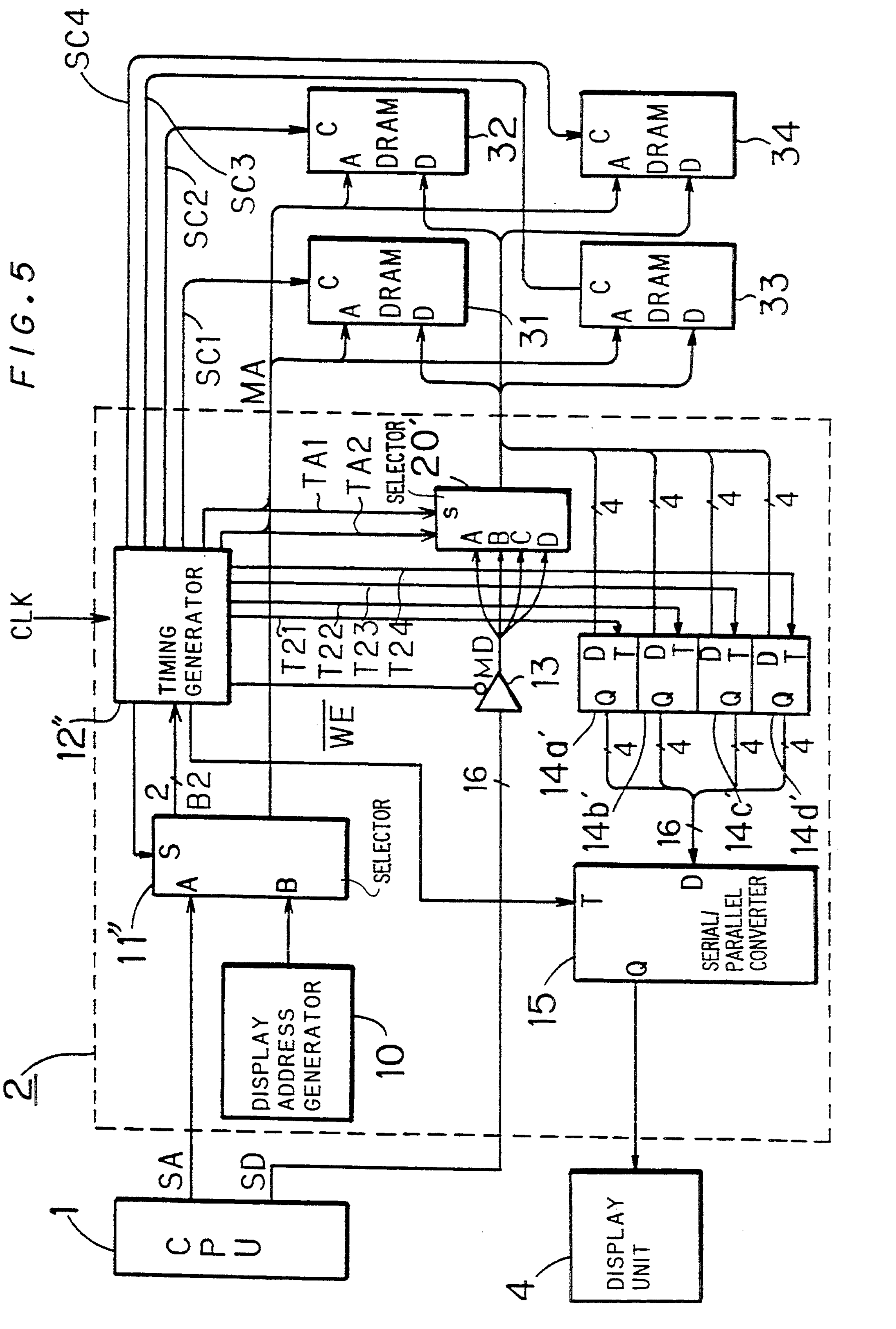
FIG. 5 is a block diagram showing a structure of a display device of another embodiment according to the present invention.

FIG. 5 is a block diagram showing the display device of still another embodiment according to the present invention. The display device employs system data SD corresponding to 16 bits. As shown in FIG. 5, the timing generator 12″ synchronizes a clock CLK received from the outside and takes in the least significant 2-bit data B2 of the inside address MA which the selector 11′ takes in at its A-input or B-input.

Then, in accordance with the 2-bit data B2, a control signal SC1 consisting of a row address strobe signal $\overline{\text{RAS1}}$, a column address strobe signal $\overline{\text{CAS1}}$ and a writing control signal $\overline{\text{WE1}}$ is applied to a control input C of a DRAM 31, a control signal $\overline{\text{SC2}}$ consisting of a row address strobe signal RAS2, a column address strobe signal CAS2 and a writing control signal WE2 is applied to a control input C of a DRAM 32 in accordance with the 2-bit data B2. A control signal SC3 consisting of a row address strobe signal RAS3, a column address strobe signal CAS3 and a writing control signal WE3 is applied to a control input C of a DRAM 33, a control signal SC4 consisting of a row address strobe signal RAS4, a column address strobe signal CAS4 and a writing control signal WE4 is applied to a control input C of a DRAM 34. These control signals SC1 to SC4 are independent of each other.

The timing generator 12″ applies a timing signal T21 to a T-input of a holding circuit 14*a*′, a timing signal T22 to a T-input of a holding circuit 14*b*′, a timing signal T23 to a T-input of a holding circuit 14*c*′, and a timing signal T24 to a T-input of a holding circuit 14*d*′. Then, the timing generator 12″ also applies 2-bit timing addresses TA1 and TA2 to a control input S of a selector 20′ to output the timing address as TA1 and TA2 as the least significant 2 bits of an inside address MA.

The selector 20′ is interposed between an output of a buffer 13 and data inputs/outputs D of the DRAMs 31 to 34, and it takes in 16-bit inside data MD received from the buffer 13 in the higher 4 bits at its A-input to D-input. Then, the selector 20′ outputs one of 4-bit data taken in at its A-input to D-input in accordance with 1/0 of each of the timing addresses TA1 and TA2 received at the control input S. Other components and operations are similar to those in the embodiment shown in FIG. 1, and the description about them is omitted.

Figure 6:
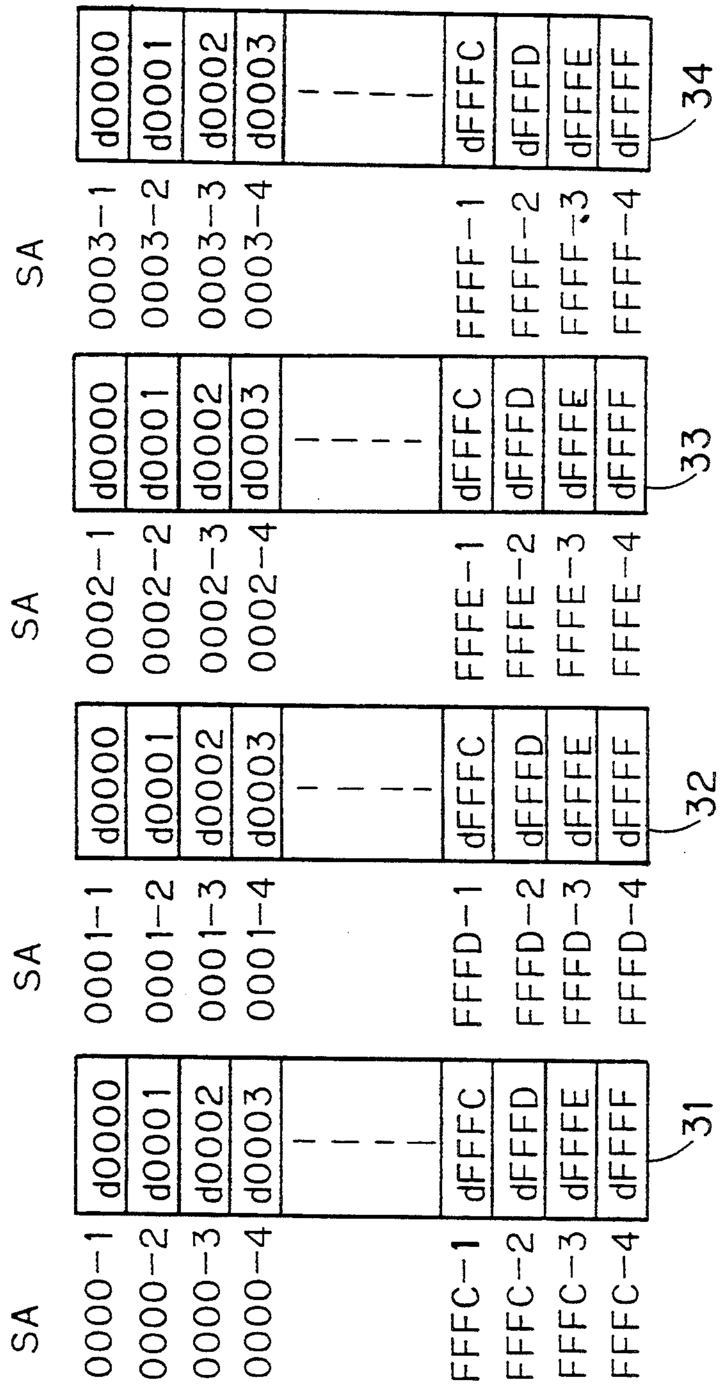
FIG. 6 is a diagram showing an address arrangement in DRAMs shown in FIG. 5.

FIG. 6 is a diagram showing an address arrangement in the DRAMs 31 to 34. As shown in FIG. 6, the DRAM 31 stores data by 4 bits successively from the lowest to the highest in 4 addresses corresponding to addresses 0000 h, 0004 h to FFFCh of a system address SA of which least significant 2 bits are "00". The DRAM 32 stores data by 4 bits successively from the lowest to the highest in 4 addresses corresponding to addresses 0000 h, 0005 h to FFFDh of the system address SA of which least significant 2 bits are "01" The DRAM 33 stores data by 4 bits successively from the lowest to the highest in 4 addresses corresponding to addresses 0002 h, 0006 h to FFFEh of the system address SA of which least significant 2 bits are "10". The DRAM 34 stores data by 4 bits successively from the lowest to the highest in addresses corresponding to addresses 0003 h, 00007 h to FFFFh of the system address SA of which least significant 2 bits are "11".

With the structure as mentioned above, even with four DRAMs, high speed reading operations, such as the page mode reading, can be carried out during the display period by performing the display data reading operations independently on the DRAMs 31 to 34, and thus, the total period for the display data reading operation can be shortened. As a result, the number of display data writing cycles interrupting the display period can be increased, and accordingly, a time for the display data writing during the display period can be saved.

Although 64K×4 DRAMs are used as an example in this embodiment, applicable DRAMs should not be restricted to this type, and DRAMs of other structures, such as 64K×16 DRAMs each of which has a wide data bus, can be applied to this invention.

While the invention has been shown and described in detail, the foregoing description is in all aspects illustrative and not restrictive. It is therefore understood that numerous modifications and variations can be devised without departing from the scope of the invention.

I claim:

1. A display device having a built-in memory for performing display data reading and writing operations, comprising:

a plurality of memories, said display data being read from and written to each of said plurality of memories in units of n bits, n being an integer;

memory selecting means for receiving an absolute address and selecting a selected memory of said plurality of memories on the basis of at least a part of said absolute address to access said selected memory independent of other memories;

access address producing means for producing m access addresses on the basis of said absolute address, m being an integer;

writing control means for receiving writing data of (n×m) bits and storing said writing data as n bits in each of said m access addresses in said selected memory in writing said display data;

reading control means for extracting n-bit data stored in each of said m access addresses in said selected memory in reading said display data to output display data of (n×m) bits; and a display unit which receives said display data and displays an image on the basis of said display data.

2. A display device according to claim 1, wherein said plurality of memories are DRAMs.

3. A display device according to claim 1, further comprising absolute address applying means including a CPU for outputting a system address, a display address generator for generating a display address, and selecting means for outputting said system address as said absolute address in writing said display data while outputting said display address as said absolute address in reading said display data.

4. A display device according to claim 1, further comprising data applying means including a CPU for generating said writing data of (n×m) bits.

5. A display device according to claim 1, wherein said writing control means includes selecting means for receiving said writing data as n bits in parallel to output one of m latch data of n bits on the basis of at least a part of a corresponding access address.

6. A display device according to claim 1, wherein said reading control means includes m holding circuits having their respective inputs commonly connected to data outputs of said plurality of memories for holding n-bit data received from respective inputs as n-bit latch data when it is activated, said m holding circuits outputting the n-bit latch data after it is selectively activated, and a parallel/serial converter for receiving said n-bit latch data of said m holding circuits to output display data of (n×m) bits.

7. A display device according to claim 1, wherein said m access addresses are successive addresses.

8. A display device according to claim 7, wherein said m access addresses are composed of row and column addresses, said row addresses being fixed while said column addresses are in succession, said reading control means performing a page mode reading operation on said m access addresses in said selected memory.

* * * * *